(12) United States Patent
Durkee

(10) Patent No.: US 7,296,589 B2
(45) Date of Patent: Nov. 20, 2007

(54) UNIVERSAL GAS VALVE FINISHING FLANGE ASSEMBLY

(76) Inventor: William A. Durkee, 14406 Cedar St., Hesperia, CA (US) 92345

( * ) Notice: Subject to any disclaimer, the term of this patent is extended or adjusted under 35 U.S.C. 154(b) by 388 days.

(21) Appl. No.: 11/076,369

(22) Filed: Mar. 9, 2005

(65) Prior Publication Data
US 2006/0201552 A1  Sep. 14, 2006

(51) Int. Cl.
*F16K 5/00* (2006.01)
(52) U.S. Cl. ............... 137/359; 137/269; 251/292
(58) Field of Classification Search ............ 137/269, 137/359, 361; 251/291, 292, 304
See application file for complete search history.

(56) References Cited

U.S. PATENT DOCUMENTS

| | | | | |
|---|---|---|---|---|
| 1,677,634 A | * | 7/1928 | Horton et al. ............ 137/883 |
| 1,753,853 A | * | 4/1930 | Doty et al. ............... 138/89 |
| 3,582,116 A | * | 6/1971 | Young ................. 403/359.1 |
| 4,306,468 A | * | 12/1981 | Bolgert ................... 74/548 |
| 4,445,529 A | * | 5/1984 | Lagarelli ................ 137/360 |
| 4,951,702 A | * | 8/1990 | Brotcke ................. 137/218 |
| 4,961,443 A | * | 10/1990 | Buccicone et al. ..... 137/315.15 |
| 5,152,503 A | * | 10/1992 | Conway ............... 251/315.14 |
| 5,829,469 A | * | 11/1998 | Sileno et al. ........... 137/15.08 |
| 7,055,412 B2 | * | 6/2006 | Leighton .................. 81/124.4 |

* cited by examiner

*Primary Examiner*—John Fox
(74) *Attorney, Agent, or Firm*—Stetina Brunda Garred & Brucker

(57) ABSTRACT

A universal gas valve finishing flange assembly is provided which is adapted to receive a plurality of different size gas valves. The finishing flange assembly comprises a flanged coupler comprising a pipe coupler having internal threads and a pair of ends. The internal threads are adapted to be received by a first gas shut-off valve with a valve stem leg having threads with a first diameter. The flanged coupler further includes a flange attached to one end of the coupler and is centered about an axis defined by the coupler. The flange further includes an orifice for receiving a gas valve key. A trim plate is also provided having a frontside and a backside and a hole there through to receive the pipe coupler. Also, the trim plate includes recess disposed in the frontside to receive the flange. Additionally, a reducer nipple is provided having outer threads and inner threads. The outer threads are correspondingly sized to be received by the internal threads of the pipe coupler, and the inner threads are adapted to be received by a second gas shut-off valve with a valve stem leg having threads with a second diameter.

23 Claims, 5 Drawing Sheets

UNIVERSAL GAS VALVE FINISHING FLANGE ASSEMBLY

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

1. Field of the Invention

The present invention is related to finishing floor plates or wall covers for gas shut-off valves. In particular, the present invention relates to a universal gas valve finishing flange assembly which is adapted to be interfaced with a plurality of gas valves of different sizes.

2. Background of the Invention

Many modern fireplaces now utilize gas to provide a flame or use gas to assist in lighting real firewood. Common to both is a source of natural gas which is piped within proximity of the hearth of the fireplace. Typically, the gas source is controlled by a shut-off valve near the fireplace. Downstream of the shut-off valve, accessories such as log lighter burner pipes or air-gas mixing chambers may be installed to condition the flow of gas out into the fireplace and to distribute the gas such that an optimal flame may be burned.

Most gas shut-off valves provide a stem of which a gas valve key is adapted to interface. For example, the stem most commonly has a square cross section, while the gas valve key normally has a receiving socket which is adapted to receive the stem. A handle is provided on the gas valve key so that the operator can easily provide the leverage to rotate the key. When the handle on the key is turned, the valve may then be opened or closed.

Typically, the gas shut-off valve is positioned proximate the fireplace. For instance, sometimes the gas shut-off valve and affiliated gas pipes may be routed underneath the floor of the dwelling. In this case, the valve stem leg either protrudes directly out of the floor, or it may be recessed underneath the floor. The latter is preferred, not only for aesthetic reasons, but also for safety purposes. I.E. It is safer to have the gas valve stem recessed out of harms way so that it does not inadvertently get damaged. Other times the gas shut-off valve and affiliated gas pipes are routed within the walls of the dwelling. In this case, the gas valve stem is most often recessed into the wall.

In the circumstances when the gas valve stem is recessed either in the floor or wall, it is common practice to use a floor plate, wall cover, finishing flange or other devices to provide aesthetic finishing between the hole in the floor or wall and the leg of the gas valve with the stem.

A common problem occurs when the person who obtains the floor plate or wall cover during the construction phase of the gas fireplace (1) realizes after the purchase of a new floor plate or wall cover, or (2) is apprised by an informed fireplace supplies store employee, that there are different sizes of gas valves. Many times the purchaser brings the finishing device home and then only when an attempt is made to install the finishing onto the leg of the gas shut-off valve which houses the stem, the purchaser is made aware that they bought the wrong sized finishing device. Other times, the purchaser is made aware of the dilemma at the store, and has to make a guess as to which size gas valve their system may utilize.

It would be beneficial to provide a gas valve finishing flange assembly which universally works on different size gas valves. If such a device could be devised, the purchaser would be relieved of the headaches of inadvertently purchasing the wrong size gas valve finishing flange. Moreover, the supplier can save shelf space and reduce inventory by providing a universal gas valve finishing flange, instead of having to stock multiple sets of gas valve finishing flanges which are only capable of being used with one specific sized gas shut-off valve.

SUMMARY OF THE INVENTION

The present invention overcomes the aforementioned disadvantages by providing a universal gas valve finishing flange assembly which is adapted to fit to different sized gas shut-off valves.

An exemplary embodiment of the present invention includes a flanged coupler, trim plate and reducer nipple, according to an aspect of the present invention. The flanged coupler comprises a pipe coupler having internal threads and a pair of ends. The internal threads are adapted to be received by a first gas shut-off valve with a valve stem leg having threads with a first diameter. The flanged coupler also includes a flange attached to one end of the coupler and centered about an axis defined by the coupler, wherein the flange has an orifice for receiving a gas valve key.

The trim plate has a frontside and a backside and a hole there through to receive the pipe coupler. The trim plate frontside further has a recess to receive the flange. The reducer nipple may be formed from a pipe. The nipple has outer threads and inner threads, wherein the outer threads are correspondingly sized to be received by the internal threads of the pipe coupler, and the inner threads are adapted to be received by a second gas shut-off valve with a valve stem leg having threads with a second diameter.

According to another aspect of the present invention, the flange and pipe coupler are unitarily formed together. According to another aspect of the present invention, the flange and the recess have a circular shape such that the flange may fit flushly within the recess. According to another aspect of the present invention, the flange has a thickness $T_1$ that is generally equivalent to a depth of the recess. In yet another aspect of the present invention, the trim plate has an overall thickness $T_2$, wherein the depth of the recess $T_1$ is less than the thickness $T_2$.

In another aspect of the present invention, the flanged coupler and the trim plate are milled from billet material. According to another aspect of the present invention, the finishing flange assembly is formed from one of plastic, metal, PVC and resin.

Furthermore, according to an aspect of the present invention, the pipe coupler has a plurality of bores, wherein each bore is adapted for receiving a set screw. Moreover, the backside of trim plate adapted to interface a planar surface. According to still another aspect of the present invention, when the flange coupler is installed in the trim plate, the trim plate is adapted to freely rotate about the pipe coupler and the flange. In another aspect of the present invention, the first diameter is ¾ inch and the second diameter is ½ inch.

Additionally, a second embodiment of the present invention is provided as a kit for a universal gas valve finishing flange assembly adapted to receive a plurality of different size gas valves. The finishing flange assembly kit includes a flanged coupler comprising a pipe coupler having internal threads and a pair of ends, wherein the internal threads are adapted to be received by a first gas shut-off valve with a valve stem leg having threads with a first diameter. A flange is attached to one end of the coupler and centered about an axis defined by the coupler. The flange also has an orifice for receiving a gas valve key. The kit also includes a trim plate having a frontside and a backside and a hole there through to receive the pipe coupler. The frontside further has a recess to receive the flange. The kit further includes a reducer nipple formed from a pipe, wherein the nipple has outer threads and inner threads. The outer threads are correspondingly sized to be received by the internal threads of the pipe coupler, and the inner threads are adapted to be received by a second gas shut-off valve with a valve stem leg having threads with a second diameter.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numerals represent similar parts throughout several views of the drawings, and in which.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Overview of the Present Invention

FIGS. 1 through 5 illustrate an exemplary embodiment of a universal gas valve finishing flange assembly 2, according to an aspect of the present invention. The flange assembly 2 includes the following main components: a flanged coupler 4, a trim plate 6, and a reducer nipple 8. The flange assembly 2 may be manufactured from a variety of materials such as metal, plastic, PVC, resin or any material suitable for piping and/or finishing devices. In one preferred embodiment, the flange assembly 2 may be milled from billet aluminum.

Figure 1:
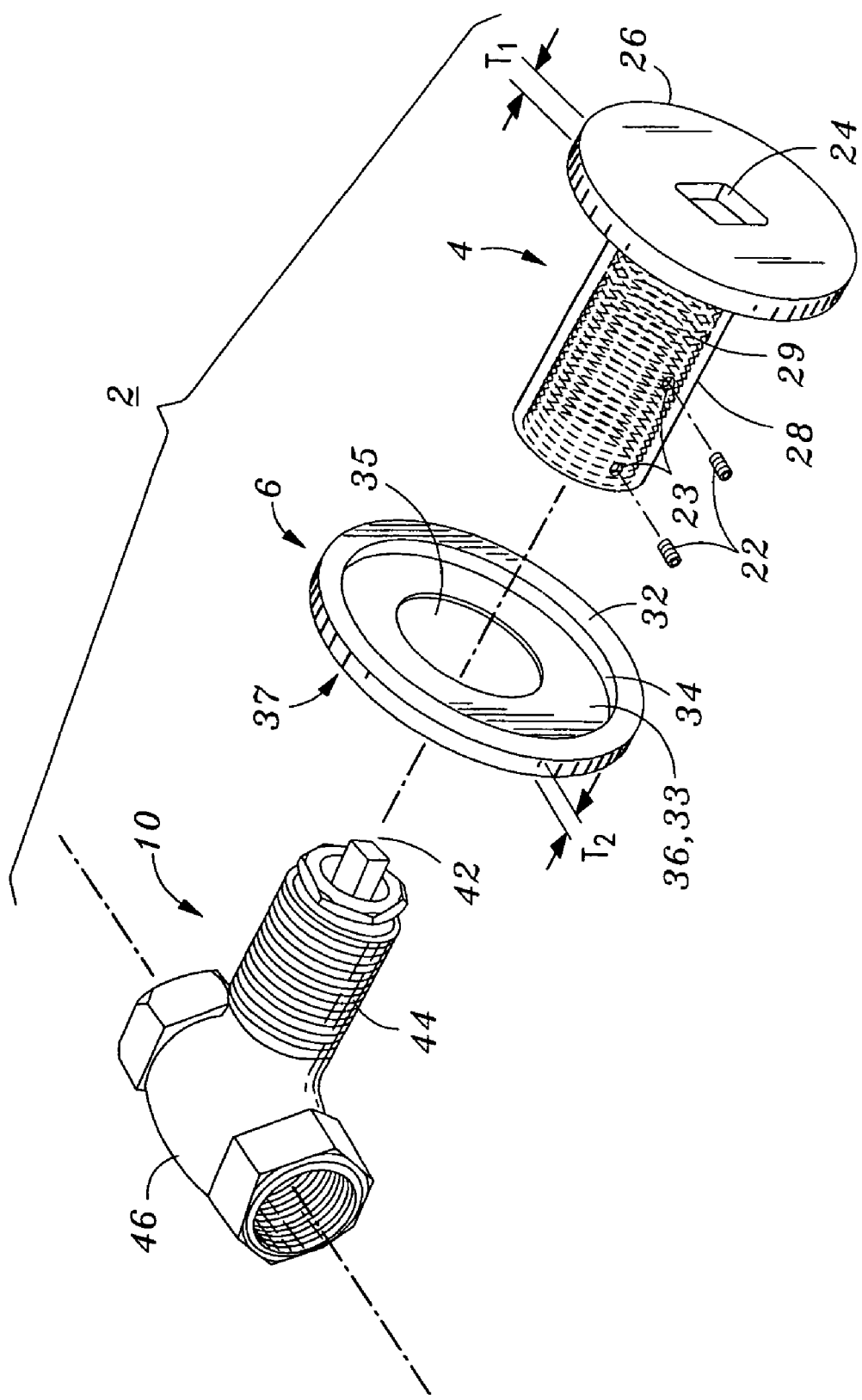
FIG. 1 is an exploded view of an exemplary embodiment of the universal gas valve finishing flange assembly configured to be installed onto a ¾ inch gas shut-off valve, according to an aspect of the present invention.
Figure 2:
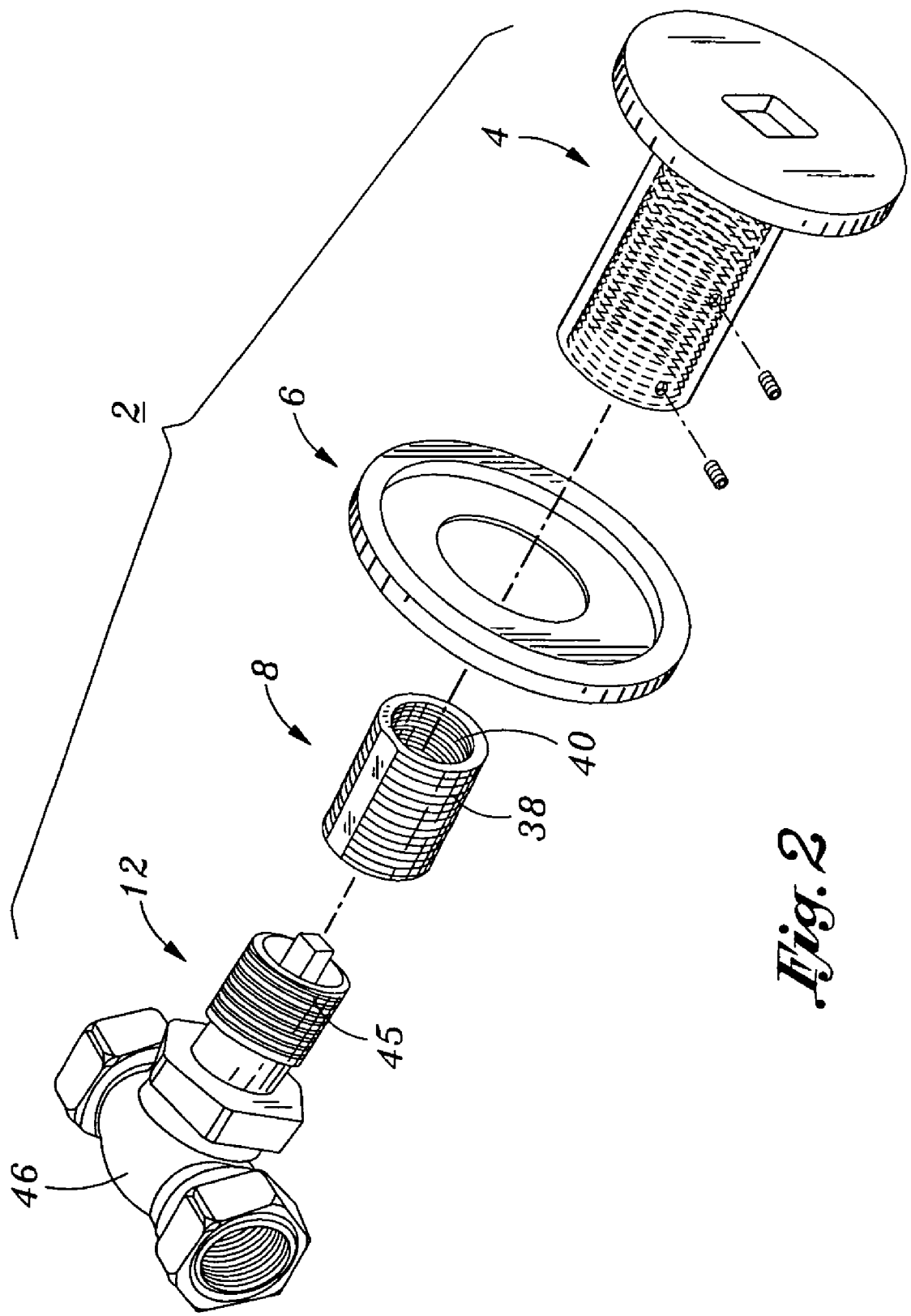
FIG. 2 is an exploded view of the universal gas valve finishing flange assembly configured to be installed onto a ½ inch gas shut-off valve, according to an aspect of the present invention.

The flanged coupler 4 comprises two main components including a circular flange 26 and an internally threaded pipe coupler 28. The flange 26 is centered about the axis defined by the coupler 28 and has a diameter $D_1$ and thickness $T_1$. The circular flange 26 and pipe coupler portion 28 are preferably unitarily formed, however, the coupler 28 may be attached to the end of the coupler by other means such as welding or other fusion technologies known in the art. An orifice 24 is disposed through the center of the circular flange 26 to provide unobstructed access to the valve stem 42 of the gas shut-off valve 10 or 12. In a preferred embodiment, the size of the internal threads 29 in the coupler 28 are adapted to receive a valve stem leg 44 of a ¾ inch gas valve shut-off valve 10. However, it is appreciated that the size of the internal threads 29 may vary according to various embodiments and applications. Also, the coupler 28 has a diameter $D_2$, the significance of which is discussed later. As shown in FIGS. 1 and 2, the coupler 28 further includes a plurality of threaded holes 21 to receive small set screws 22.

The trim plate 6 is a separate part which preferably has a circular shape and has an overall thickness $T_2$. The trim plate 6 includes a centered circular receiving recess 33. The shape of the recess 33 is adapted to flushly receive the circular flange 26. Thus, the diameter of the recess 33 is slightly larger than the circular flange 26 diameter $D_1$ and the depth of the recess 33 may be about the same thickness $T_1$ of the flange 26. To form the receiving recess 33, an outer rim 32 is provided about the circular perimeter of the trim plate 6. A recessed shoulder side 34 defines the inner circular perimeter of the recess 33. Additionally, a recessed surface 36 forms the bottom of the recess 33. The backside 37 of the trim plate 6 is preferably flat so that it will easily interface with the planer surface of a floor 16 or wall 18. Moreover, a centered circular hole 35 having a diameter slightly greater than the coupler 28 diameter $D_2$ is disposed through the trim plate 6. As shown in FIG. 1, the trim plate 6 hole 35 is adapted to receive the coupler portion 28.

The reducer nipple 8 may be formed from piping. The nipple 8 has outer threads 38 and inner threads 40. The outer threads 40 are sized such that they can be received by internal threads 29 disposed within the coupler portion 28. Thus, in the exemplary embodiment, the outer threads 38 preferably have a diameter of ¾ inch. Furthermore, the inner threads 40, preferably have a ½ inch diameter which are adapted to receive a ½ inch valve stem leg 43 (see FIGS. 2 and 4). It is appreciated that the size of the outer threads 38 and inner threads 40 may vary according to various embodiments and applications of the present invention.

¾ Inch Gas Shut-off Valve Configuration

The following paragraphs now describe the various configurations in which the universal gas valve finishing flange assembly 2 may be implemented. FIG. 1 is an exploded view of an exemplary embodiment of the universal gas valve finishing flange assembly 2 configured to be installed onto a ¾ inch gas shut-off valve 10, according to an aspect of the present invention. If a ¾ inch gas shut-off valve 10 is utilized in the gas fireplace system, only the flanged coupler 4 and trim plate 6 are utilized.

Exemplary Wall Installation

Figure 3:
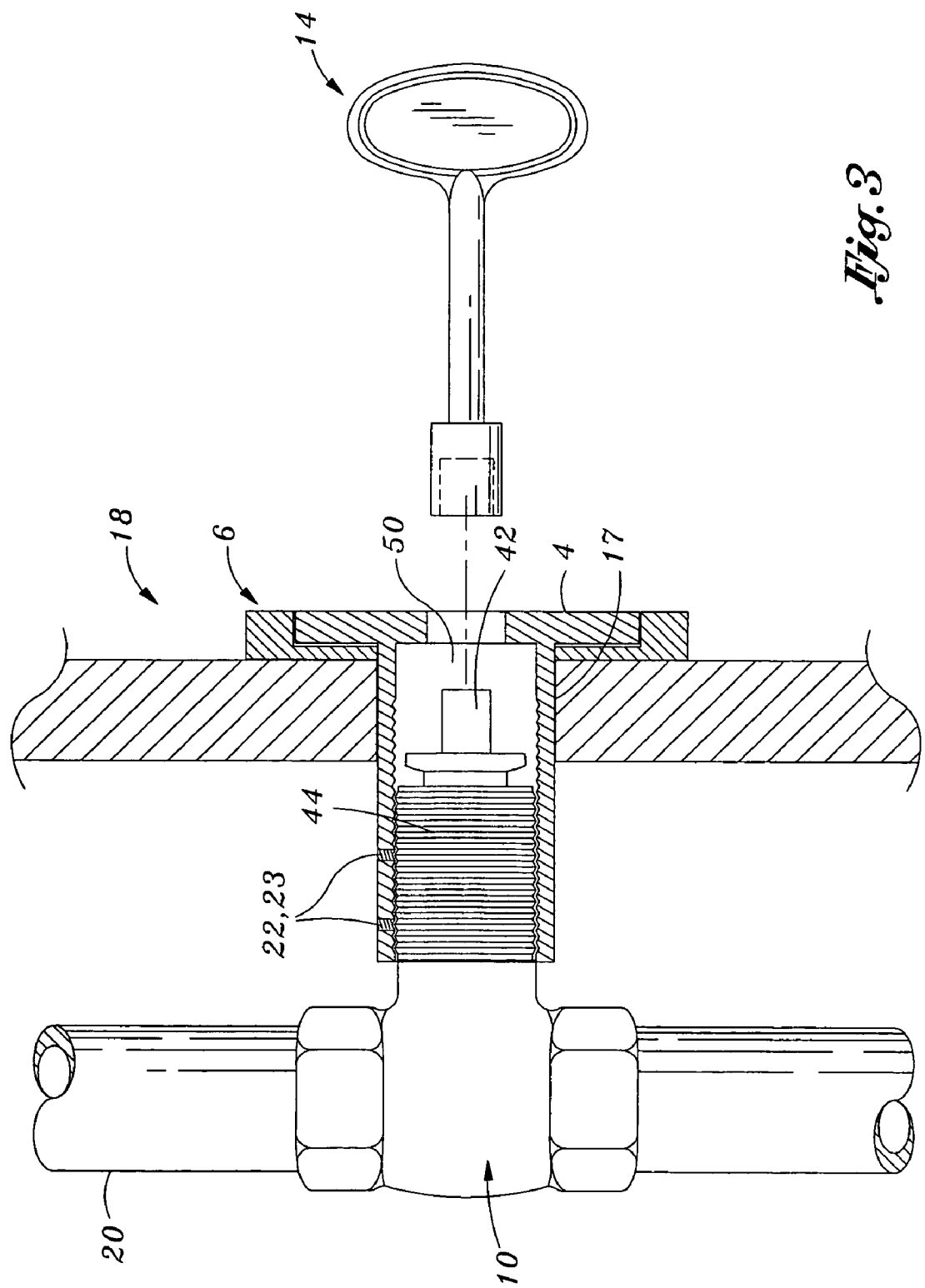
FIG. 3 is a cross-sectional view of the universal gas valve finishing flange assembly installed onto a ¾ inch gas shut-off valve located behind a wall, according to an aspect of the present invention.

FIG. 3 is a cross-sectional view of the universal gas valve finishing flange assembly 2 installed onto the ¾ inch gas shut-off valve 10 located behind a wall 18, according to an aspect of the present invention. From FIG. 3, it can be seen how the flange assembly 2 is assembled and installed. The valve 10 should be positioned proximate a desired position on the backside of the wall 18 such that the valve stem leg 44 is oriented toward and normal to the wall 18. Also, a hole 17 should be cut into the wall 18 such that access to the valve stem leg 44 is provided. Then, the coupler portion 28 of the flanged coupler 4 is inserted through the receiving hole 35 disposed in the trim plate 6 such that the receiving recess 33 is facing toward the bottom of the circular flange portion 26. Next, the flanged coupler 4 is then threaded onto the threads disposed on the outer surface of the valve stem leg 44. The flanged coupler 4 may then be tightened until the flange portion 26 is flushly received into the receiving recess 33. Additionally, if access is available from behind the wall 18, a pair of set screws 22 may be installed into set screw holes 23 on the coupler portion 28 to further secure the coupler portion 28 to the valve stem leg 44. To operate the valve 10, a gas valve key 14 may then be inserted into a cavity 50 which is formed internally within the coupler portion 28. In particular, the socket of the key 14 is adapted to receive the exposed distal tip of the valve stem 42. The valve 10 may then be opened or closed by turning the gas valve key 14.

½ Inch Gas Shut-off Valve Configuration

FIG. 2 is an exploded view of an exemplary embodiment of the universal gas valve finishing flange assembly 2 configured to be installed onto a ½ inch gas shut-off valve 10, according to an aspect of the present invention. When a ½ inch gas shut-off valve is utilized in the gas fireplace system, the reducer nipple 8 is used in conjunction with the flanged coupler 4 and trim plate 6.

Exemplary Floor Installation

Figure 4:
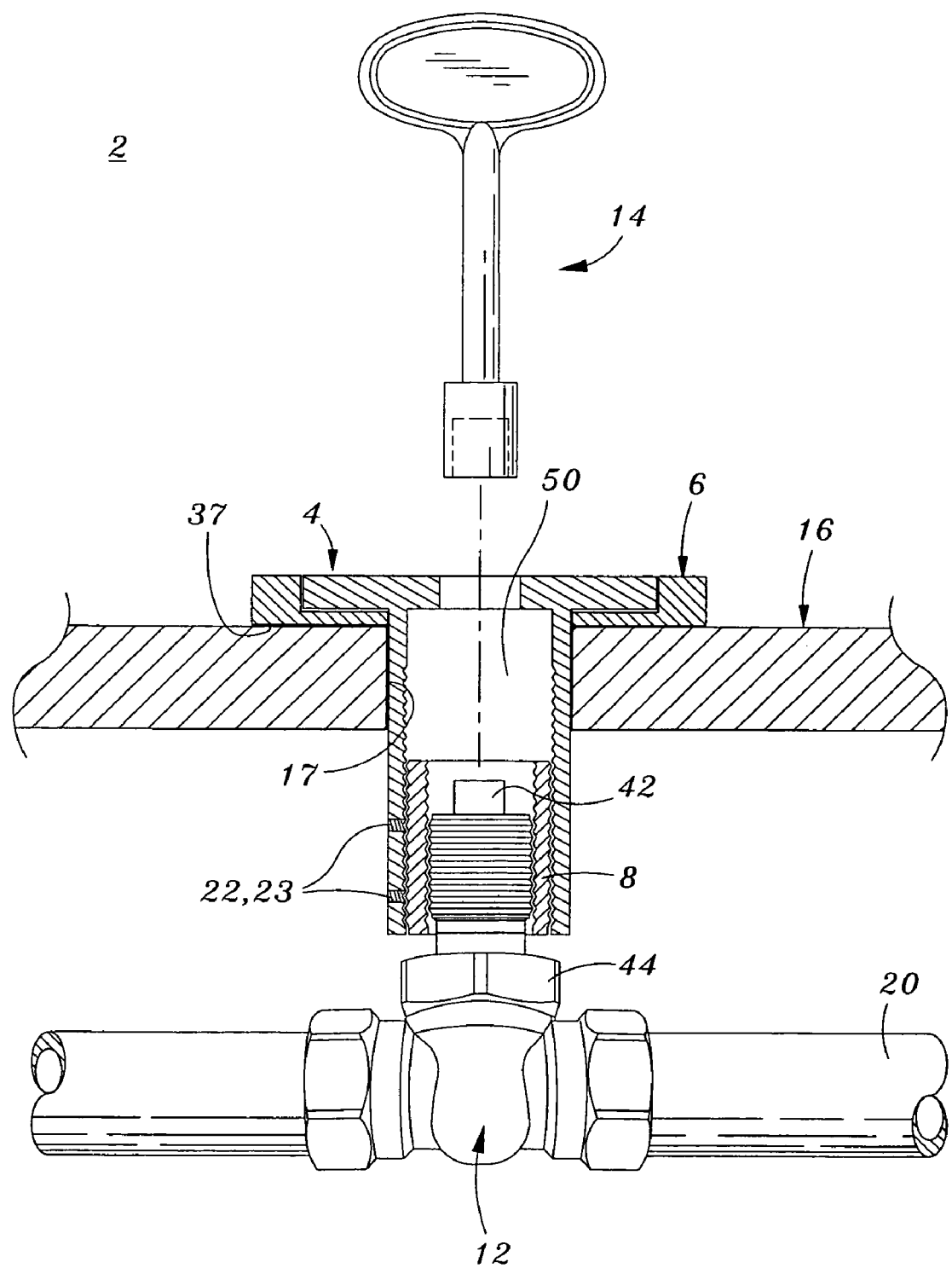
FIG. 4 is a cross-sectional view of the universal gas valve finishing flange assembly installed onto a ½ inch gas shut-off valve located underneath a floor, according to an aspect of the present invention.

FIG. 4 is a cross-sectional view of the universal gas valve finishing flange assembly 2 installed onto the ½ inch gas shut-off valve 10 positioned underneath a floor 16, according to another aspect of the present invention. From FIG. 4, it is seen how the flange assembly 2 may be assembled and installed. The valve 10 should be positioned proximate a desired position underneath the floor 16 such that the valve stem leg 44 is upwardly oriented toward and normal to the floor 16. Also, a hole 17 should be cut into the floor 16 such that access to the valve stem leg 44 is provided. Then, the coupler portion 28 of the flanged coupler 4 is inserted through the receiving hole 35 disposed in the trim plate 6 such that the receiving recess 33 is facing toward the bottom of the circular flange portion 26. Next, the reducer nipple 8 is threaded into the coupler portion 28 to provide the flange assembly with ½ inch threads for receiving the valve stem leg 44 of the ½ inch gas shut-off valve 12. The flanged coupler 4 is then threaded onto the ½ inch threads disposed on the outer surface of the valve stem leg 44. The flanged coupler 4 should then be tightened until the flange portion 26 is flushly received into the receiving recess 33 of the trim plate 6. Additionally, if access is available from underneath the floor 16, a pair of set screws 22 may be installed into set screw holes 23 on the coupler portion 28 to further secure the coupler portion 28 to the valve stem leg 44. To operate the valve 12, a gas valve key 14 may then be inserted into a cavity 50 which is formed internally within the coupler portion 28. In particular, the socket of the key 14 is adapted to receive the exposed distal tip of the valve stem 42. The valve 12 may then be opened or closed by turning the gas valve key 14.

Figure 5:
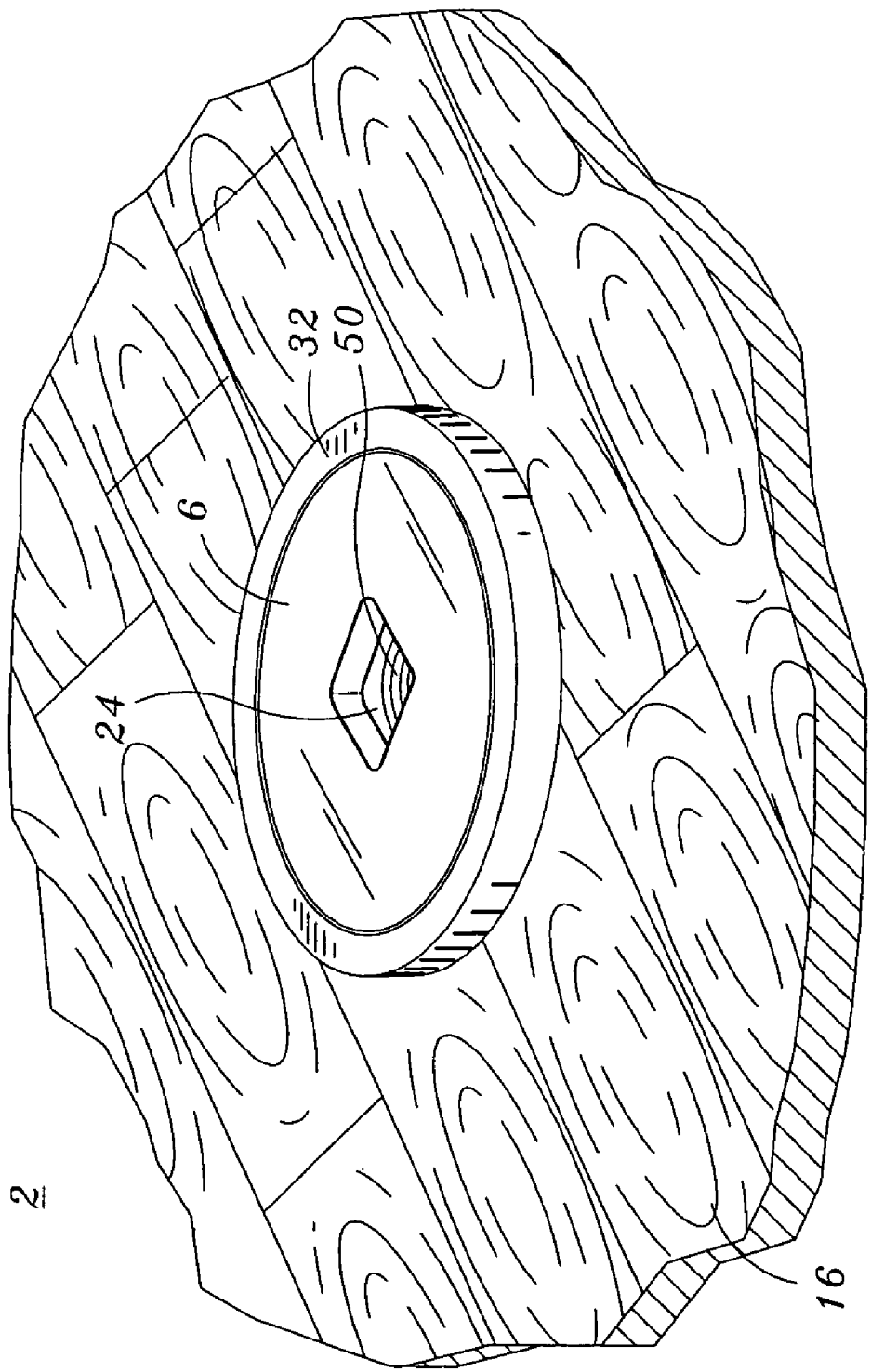
FIG. 5 shows an exemplary installation of the universal gas valve finishing flange assembly installed into a floor, according to an aspect of the present invention.

FIG. 5 shows an exemplary installation of the universal gas valve finishing flange assembly 2 installed into a floor 16. Once the flange assembly 2 is installed, the only visible parts are the outer rim 32 of the trim plate 6 and the frontside of the circular flange 26 of the flanged coupler 4. As shown in FIG. 5, the orifice 24 provides a pathway through the cavity 50 in which the valve stem 42 is housed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such are within the scope of the appended claims.

What is claimed:

1. A universal gas valve finishing flange assembly adapted to receive a plurality of different size gas valves, said finishing flange assembly comprising:
   a flanged coupler comprising,
      a pipe coupler having internal threads and a pair of ends, said internal threads adapted to be received by a first gas shut-off valve with a valve stem leg having threads with a first diameter; and
      a flange attached to one end of said coupler and centered about an axis defined by said coupler, said flange having an orifice for receiving a gas valve key; and
   a trim plate having a frontside and a backside and a hole there through to receive said pipe coupler, said frontside further having a recess to receive said flange.

2. The finishing flange assembly according to claim 1, further comprising a reducer nipple formed from a pipe, said nipple having outer threads and inner threads, said outer threads correspondingly sized to be received by said internal threads of said pipe coupler, and said inner threads adapted to be received by a second gas shut-off valve with a valve stem leg having threads with a second diameter.

3. The finishing assembly according to claim 1, wherein said flange and pipe coupler are unitarily formed together.

4. The finishing assembly according to claim 1, said flange and the recess having a circular shape such that said flange may fit flushly within the recess.

5. The finishing assembly according to claim 4, said flange having a thickness $T_1$ that is generally equivalent to a depth of the recess.

6. The finishing assembly according to claim 4, said trim plate having an overall thickness $T_2$, wherein the depth of the recess $T_1$ is less than the thickness $T_2$.

7. The finishing assembly according to claim 1, said flanged coupler and said trim plate milled from billet material.

8. The finishing assembly according to claim 1, said finishing flange assembly formed from one of plastic, metal, PVC and resin.

9. The finishing assembly according to claim 1, said a pipe coupler having a plurality of bores, wherein each bore is adapted for receiving a set screw.

10. The finishing assembly according to claim 1, said backside of trim plate adapted to interface a planar surface.

11. The finishing assembly according to claim 1, wherein when said flange coupler is installed in said trim plate, said trim plate is adapted to freely rotate about said pipe coupler and said flange.

12. The finishing assembly according to claim 3, wherein the first diameter is ¾ inch and the second diameter is ½ inch.

13. A kit for a universal gas valve finishing flange assembly adapted to receive a plurality of different size gas valves, said finishing flange assembly kit comprising:
   a flanged coupler comprising,
      a pipe coupler having internal threads and a pair of ends, said internal threads adapted to be received by a first gas shut-off valve with a valve stem leg having threads with a first diameter; and
      a flange attached to one end of said coupler and centered about an axis defined by said coupler, said flange having an orifice for receiving a gas valve key;
   a trim plate having a frontside and a backside and a hole there through to receive said pipe coupler, said frontside further having a recess to receive said flange; and
   a reducer nipple formed from a pipe, said nipple having outer threads and inner threads, said outer threads correspondingly sized to be received by said internal threads of said pipe coupler, and said inner threads adapted to be received by a second gas shut-off valve with a valve stem leg having threads with a second diameter.

14. The kit according to claim 13, wherein said flange and pipe coupler are unitarily formed together.

15. The kit according to claim 13, said flange and the recess having a circular shape such that said flange may fit flushly within the recess.

16. The kit according to claim 15, said flange having a thickness $T_1$ that is generally equivalent to a depth of the recess.

17. The kit according to claim 15, said trim plate having an overall thickness $T_2$, wherein the depth of the recess $T_1$ is less than the thickness $T_2$.

18. The kit according to claim 13, said flanged coupler and said trim plate milled from billet material.

19. The kit according to claim 13, said finishing flange assembly formed from one of plastic, metal, PVC and resin.

20. The kit according to claim 13, further comprising a plurality of set screws; and wherein said a pipe coupler has a plurality of bores adapted for receiving a set screw.

21. The kit according to claim 13, said backside of trim plate adapted to interface a planar surface.

22. The kit according to claim 13, wherein when said flange coupler is installed in said trim plate, said trim plate is adapted to freely rotate about said pipe coupler and said flange.

23. The kit according to claim 13, wherein the first diameter is ¾ inch and the second diameter is ½ inch.

* * * * *